United States Patent
Friedl et al.

(10) Patent No.: US 11,174,354 B2
(45) Date of Patent: Nov. 16, 2021

(54) PRODUCTION OF LIGNIN PARTICLES

(71) Applicant: TECHNISCHE UNIVERSITÄT WIEN, Vienna (AT)

(72) Inventors: Anton Friedl, Vienna (AT); Felix Weinwurm, Vienna (AT); Stefan Beisl, Unterdietfurt (DE)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 0 days.

(21) Appl. No.: 16/469,054

(22) PCT Filed: Dec. 22, 2017

(86) PCT No.: PCT/EP2017/084545
§ 371 (c)(1),
(2) Date: Jun. 12, 2019

(87) PCT Pub. No.: WO2018/115516
PCT Pub. Date: Jun. 28, 2018

(65) Prior Publication Data
US 2020/0071468 A1   Mar. 5, 2020

(30) Foreign Application Priority Data
Dec. 23, 2016   (AT) .............................. A 51180/2016

(51) Int. Cl.
*C08H 7/00*   (2011.01)
*D21C 11/00*   (2006.01)
*C08L 97/00*   (2006.01)

(52) U.S. Cl.
CPC ........... *C08H 6/00* (2013.01); *D21C 11/0007* (2013.01); *C08L 97/005* (2013.01)

(58) Field of Classification Search
CPC .................................................. D21C 11/0007
See application file for complete search history.

(56) References Cited

U.S. PATENT DOCUMENTS

| 4,520,105 A | * | 5/1985 | Sinner | ................. C13K 1/02 |
| | | | | 435/163 |
| 4,746,401 A | * | 5/1988 | Roberts | ................. D21C 3/222 |
| | | | | 162/72 |
| 4,764,596 A | * | 8/1988 | Lora | ................. C07D 307/50 |
| | | | | 162/16 |

(Continued)

FOREIGN PATENT DOCUMENTS

| CN | 102002165 A | 4/2011 |
| CN | 103145999 A | 6/2013 |

(Continued)

OTHER PUBLICATIONS

Weinwurm et al. (Chemical Engineering Transactions, 39, 583-588, 2014) (Year: 2014).*

(Continued)

*Primary Examiner* — Liam J Heincer
(74) *Attorney, Agent, or Firm* — McCoy Russell LLP (57) ABSTRACT

The invention relates to a method for producing lignin particles, comprising the steps of: a) extracting lignin from a lignincontaining starter material, using a mixture that comprises at least one organic solvent and water, and b) precipitating the lignin in the solution from step a).

25 Claims, 7 Drawing Sheets

(56) References Cited

U.S. PATENT DOCUMENTS

| | | | | |
|---|---|---|---|---|
| 5,021,531 | A * | 6/1991 | Schroeder | C08H 6/00 527/400 |
| 5,730,837 | A * | 3/1998 | Black | D21C 3/20 127/37 |
| 2007/0259412 | A1* | 11/2007 | Belanger | D21C 5/00 435/161 |
| 2009/0062516 | A1* | 3/2009 | Belanger | D21C 5/00 530/502 |
| 2010/0159519 | A1* | 6/2010 | Diner | C12P 19/02 435/72 |
| 2010/0305241 | A1* | 12/2010 | Balakshin | D21H 11/00 524/74 |
| 2013/0210100 | A1* | 8/2013 | Berlin | C12P 19/14 435/165 |
| 2013/0217869 | A1* | 8/2013 | Ters | C08H 6/00 530/507 |
| 2014/0275501 | A1 | 9/2014 | Capanema et al. | |
| 2014/0288284 | A1* | 9/2014 | Bjorklund | C08H 6/00 530/500 |
| 2014/0329999 | A1* | 11/2014 | Friedl | B01D 61/027 530/500 |
| 2015/0203522 | A1* | 7/2015 | Valkonen | D21C 11/0007 530/500 |
| 2016/0130369 | A1* | 5/2016 | Iakovlev | C12P 19/14 435/99 |
| 2016/0289255 | A1* | 10/2016 | Dybov | C07G 1/00 |
| 2016/0298295 | A1* | 10/2016 | Dybov | C07G 1/00 |
| 2017/0247834 | A1* | 8/2017 | Bozell | D01C 1/02 |
| 2017/0247835 | A1* | 8/2017 | Leschinsky | D21C 3/20 |
| 2018/0030555 | A1* | 2/2018 | Van Tuel | C13K 1/04 |

FOREIGN PATENT DOCUMENTS

| | | |
|---|---|---|
| CN | 104497322 A | 4/2015 |
| DE | 102014221238 A1 | 4/2016 |
| NZ | 538446 A | 1/2008 |
| WO | 2010026244 A1 | 3/2010 |
| WO | 2010058185 A1 | 5/2010 |
| WO | 2012126099 A1 | 9/2012 |
| WO | 2013182751 A1 | 12/2013 |
| WO | 2016197233 A1 | 12/2016 |

OTHER PUBLICATIONS

ISA European Patent Office, International Search Report Issued in Application No. PCT/EP2017/084545, dated Apr. 4, 2018, WIPO, 6 pages.

Weinwurm, F. et al., "Principles of Ethanol Organosolv Lignin Precipitation: Process Simulation and Energy Demand," Chemical Engineering Transactions, vol. 39, Aug. 20, 2014, 6 pages.

Federal Service for Intellectual Property (ROSPATENT), Office Action Issued in Application No. 2019123096, dated Mar. 10, 2021, 12 pages.

* cited by examiner

PRODUCTION OF LIGNIN PARTICLES

CROSS-REFERENCE TO RELATED APPLICATIONS

The present application is a U.S. National Phase of International Patent Application Serial No. PCT/EP2017/084545 entitled "PRODUCTION OF LIGNIN PARTICLES," filed on Dec. 22, 2017. International Patent Application Serial No. PCT/EP2017/084545 claims priority to Austrian Patent Application No. A 51180/2016, filed on Dec. 23, 2016. The entire contents of each of the above-cited applications are hereby incorporated by reference for all purposes.

TECHNICAL FIELD

The present invention relates to a process for the production of lignin particles, in particular of nanolignin.

BACKGROUND

Lignins are solid biopolymers consisting of phenolic macromolecules which are stored in the cell wall of plants. In plants, lignins are primarily responsible for the strength of the plant tissue. When producing cellulose or paper from plant material, the solid cell wall component lignin is separated from the cellulose using a variety of processes (for example sulphite process, kraft pulping, organosolv process).

US 2014/0275501 describes the production of lignin which has a lower level of degradation than conventionally isolated lignin. In that process, lignin is extracted from a biomass comprising lignin with the aid of a fluid comprising sub-critical or super-critical water. In addition to water, the extraction agent may comprise methanol, ethanol or propanol, for example, wherein a mixture of that type comprises at least 80% by volume of the organic solvent. Finally, lignin can be precipitated from a lignin-containing extraction solution by decreasing the pH to approximately 2.

WO 2016/197233 concerns an organosolv process with the aid of which high purity lignin comprising at least 97% lignin can be produced. In that process, a lignin-containing starting material is initially treated with a solvent mixture comprising ethanol and water, in order to remove compounds from the starting material which dissolve in the solvent mixture. Subsequently, the lignin-containing material is treated with a Lewis acid which is also contained in a solvent mixture comprising ethanol and water, for example. Finally, lignin is precipitated from the lignin-containing solution by decreasing the pH.

NZ 538446 concerns a process for the treatment of lignin-containing materials such as wood, for example, in order to introduce substances into it, for example. A process for the production of lignin particles is not disclosed, however.

WO 2010/058185 describes a process for the treatment of biomass, during the course of which the biomass is separated into lignin and other components with the aid of ultrasound and an aqueous solvent system. In one possible step of the process in that international patent application, lignin is obtained by evaporation from a solvent which is not miscible with water.

In addition, WO 2012/126099 describes an organosolv process, with the aid of which aromatic compounds, i.e. lignin, can be isolated from a biomass and precipitated by evaporation or by decreasing the pH.

WO 2013/182751 discloses a process for the fractionation of lignin in which initially, lignin is dissolved with an organic solvent and water. Subsequently, ultrafiltration is carried out on the mixture so that lignin fractions can be produced which have a specific molecular weight. Subsequently, the lignin can be precipitated out.

WO 2010/026244 concerns, inter alia, various organosolv processes with which cellulose, which is enriched with lignin, inter alia, can be produced.

Lignins and in particular nanolignin is used in a multitude of industrial applications. The nanolignin obtained can be further processed in many ways, for example by attaching chemical (for example medically active or enzymatically active) ligands to the nanolignin, or the nanolignin can be effectively rendered UV-protective by ultrasound treatment.

Plastics based on nanolignin are characterized by high mechanical stability and hydrophobic properties (dirt-repellent). Thus, they are suitable for many fields of application, inter alia, for example for use in the automobile industry. In particular, nanolignin can be used in different types of fillers, as reinforcing fibres and the like. The relevant literature indicates, for example, that a controlled polymerization of nanolignin particles with styrene or methyl methacrylate can increase the material strength ten-fold compared with a lignin/polymer mixture.

Applying nanolignin to textile surfaces provides active protection against UV radiation. This can lead to its use in the production of functional textiles.

The moisture-repellent and antibacterial properties of nanolignin open up fields of application in the packaging industry (production of special packaging films), in particular in the field of food packaging.

Lignin nanoparticles can be impregnated with silver ions and coated with a cationic polyelectrolyte layer so that a naturally degradable and "green" alternative to silver nanoparticles is obtained.

Because of their high biocompatibility and antibacterial action, nanolignins are suitable, inter alia, for use in biofilms for implants. Similarly, nanolignin can be used in the pharmaceutical industry, for example in the field of the administration of substances.

Particles formed from lignin, in particular nanoparticles formed from lignin, are currently only produced by dissolving already isolated and precipitated lignin (usually by using lignin sulphonates or lignosulphonate sources, for example black liquor or alkaline lignin). In this regard, the initially precipitated lignin does not have a particulate nanoparticulate structure. These structures can be produced by firstly dissolving already-precipitated lignin and subsequently carrying out another precipitation, or secondly, by milling (see CN 103145999). Lignin particles or nanolignin may also be produced from black liquor, a lignin-rich by-product or waste product in the production of paper or cellulose, by using high pressure $CO_2$ extraction (CN 102002165). In CN 104497322, a process is described in which a lignin solution treated with ultrasound is added dropwise to deionized water and subsequently, nanolignin is separated out by centrifuging.

SUMMARY

All of the known processes for the production of lignin particles or nanolignin are procedurally complex. Thus, one aim of the present invention is to provide a simplified process for the production of lignin particles which does not suffer from the disadvantages of the prior art.

Therefore, the present invention concerns a process for the production of lignin particles, comprising the steps of:

(a) extracting lignin from a lignin-containing starting material by using a mixture comprising at least one organic solvent and water, and (b) precipitating the lignin in solution from step a).

Surprisingly, it has been shown that lignin particles can be produced directly from an extract containing lignin which can be obtained by extracting lignin from a lignin-containing starting material by using a mixture comprising at least one organic solvent and water. Until now, processes for the production of lignin particles required already-precipitated, unstructured lignin to be transformed into lignin particles either by milling or by a further precipitation step. These intermediate steps are no longer necessary with the process in accordance with the invention, because lignin particles can be precipitated directly from the extract obtained in step a). This means that using the process in accordance with the invention, it is possible to produce lignin particles which do not require any further essential steps of the process. In addition, it has been shown that advantageously, at least 90%, yet more preferably at least 95%, yet more preferably at least 96%, yet more preferably at least 97%, yet more preferably at least 98%, with respect to sugar impurities, of the lignin particles consist of lignin.

In addition to the steps a) and b) of the process, the process in accordance with the invention may comprise optional intermediate steps for removing undissolved components from the lignin-containing starting material and an optional final step for isolating the precipitated lignin particles. Thus, the process in accordance with the invention may comprise the following additional steps a1) and b1) of the process after step a) or step b):

a1) optionally, isolating the lignin-containing extract produced in step a) from undissolved components of the lignin-containing starting material, b1) optionally, isolating and washing the lignin particles from step b).

In accordance with a preferred embodiment of the present invention, the solution specified for precipitating lignin particles in step b) comprises a maximum of 1%, preferably a maximum of 0.8%, yet more preferably a maximum of 0.5%, yet more preferably a maximum of 0.3%, yet more preferably a maximum of 0.2% of insoluble components, and in particular it is free from insoluble components or is free from particles.

The lignin-containing extract obtained from step a) of the process in accordance with the invention preferably comprises a small proportion or essentially no insoluble or solid components. This has the advantage that the lignin particles precipitated from an extract of this type are of high purity and do not have to be dissolved and precipitated once again.

The lignin-containing extract obtained in step a) of the process in accordance with the invention may be purified of insoluble solid components by filtration or centrifuging, in particular by ultracentrifuging at more than 15000×g, for example, and by similar processes.

In order to store the lignin particles produced using the process in accordance with the invention for further processing, after step b) they may be isolated, washed and optionally dried. To wash the lignin particles, no liquids and processes may be used which could lead to dissolution of the lignin particles. Therefore, washing solutions are preferably used which either contain no organic solvents or contain small quantities of organic solvents (for example less than 2%, preferably less than 1%, yet more preferably less than 0.5%).

A further essential advantage of the present invention is the avoidance of sulphur compounds which are usually employed for the isolation of lignin from lignin-containing raw materials such as wood, or during the production of cellulose, during which lignin precipitates out as a by-product. Environmentally-damaging sulphur compounds are used in particular during kraft pulping and during the sulphite process.

The terms "lignin particles" or their synonym "particulate lignin" as used herein should be understood to mean particles comprising at least 80%, preferably at least 85%, yet more preferably at least 90%, yet more preferably at least 95%, yet more preferably at least 97%, yet more preferably at least 98%, yet more preferably at least 99%, yet more preferably at least 99.9% lignin, or they consist of lignin. Preferably, the particles have a size or a mean size of 10 nm to 1 µm preferably 10 to 800 nm, yet more preferably 10 to 700 nm, yet more preferably 10 to 600 nm, yet more preferably 10 to 500 nm, yet more preferably 10 to 400 nm, yet more preferably 10 to 300 nm, yet more preferably 10 to 200 nm, yet more preferably 10 to 100 nm. With the process in accordance with the invention, it is in particular possible to produce lignin particles with a mean size of less than 100 nm, preferably 10 to 100 nm. Lignin particles with the sizes in the nanometre range given above may also be described as "nanolignin" or as "nanolignin particles".

The lignin particles which can be produced with the process in accordance with the invention have an essentially round or slightly oval shape. The diameter of not exactly round lignin particles is calculated from the distance between the two points on the particle that are the farthest apart.

The term "lignin-containing starting material" as used here encompasses any material which contains lignin. Starting materials which are naturally present in nature or which can be produced from them, as long as they still contain lignin, are particularly preferably used.

In accordance with a preferred embodiment of the present invention, the mixture comprising at least one organic solvent and water comprises 10% to 90% by weight, preferably 20% to 80% by weight, yet more preferably 30% to 70% by weight, yet more preferably 40% to 65% by weight, yet more preferably 50% to 65% by weight of organic solvent.

In order to dissolve lignin out of a lignin-containing starting material or to take it up into solution, a specific quantity of organic solvent is necessary. This is the reason why the mixture for extracting the lignin comprises the quantities of organic solvent which are given above. In accordance with the invention, the extraction mixture may also comprise more than one type of organic solvent (for example at least two, preferably at least three, yet more preferably at least four organic solvents). The total quantity of organic solvents in the extraction mixture remains within the ranges cited above, even when the mixture comprises more than one organic solvent.

In accordance with a further preferred embodiment of the present invention, the at least one organic solvent is an alcohol, wherein the alcohol is a $C_1$ to $C_5$ alcohol, which is preferably selected from the group consisting of methanol, ethanol, propanol, butanol, pentanol, ethane-1,2-diol, propane-1,2-diol, propane-1,2,3-triol, butane-1,2,3,4-tetraol and pentane-1,2,3,4,5-pentol.

Preferably, in the process in accordance with the invention, alcohols are used which have a chain length of one ($C_1$) to five ($C_5$), preferably one, two, three, four or five carbon atoms. Particularly preferably, ethanol and/or methanol is used. If two or more alcohols are employed for the extraction of lignin, then preferably, ethanol and propanol are mixed with water.

Preferably, in the process in accordance with the invention, alcohols are used which have a chain length of one (C1) to five (C5), preferably one, two, three, four or five carbon atoms. Particularly preferably, ethanol and/or methanol is used. If two or more alcohols are employed for the extraction of lignin, then preferably, ethanol and propanol are mixed with water.

In accordance with a further preferred embodiment of the present invention, at least one organic solvent is a ketone, wherein the at least one ketone is preferably selected from the group consisting of acetone and 2-butanone.

The extraction mixture for the extraction of lignin may comprise at least one ketone as the organic solvent, in addition to water. The at least one ketone may be combined with at least one alcohol. Mixtures which comprise ethanol and acetone in various ratios with respect to each other are preferred in this regard.

Extraction of the lignin from a lignin-containing starting material is preferably carried out at a temperature of 100° C. to 230° C., preferably 120° C. to 230° C., yet more preferably 140° C. to 210° C., yet more preferably 150° C. to 200° C., yet more preferably 160° C. to 200° C., yet more preferably 170° C. to 195° C., yet more preferably 175° C. to 190° C.

The extraction efficiency may be increased by raising the temperature during the extraction step a) in the process of the present invention. Therefore, the extraction is carried out at the temperatures cited above.

In accordance with a particularly preferred embodiment of the present invention, the extraction is carried out at a pressure of 1 to 100 bar, preferably 1.1 to 90 bar, yet more preferably 1.2 to 80 bar, yet more preferably 1.3 to 70 bar, yet more preferably 1.4 to 60 bar.

Extraction of the lignin from the starting material is preferably carried out at a raised pressure, preferably in a pressure vessel. In this manner, conditions are generated which promote dissolution of the lignin even more.

In accordance with a preferred embodiment of the present invention, the extraction is carried out for 5 to 200 minutes, preferably 10 to 150 minutes, yet more preferably 15 to 100 minutes, yet more preferably 15 to 80 minutes, yet more preferably 30 to 70 minutes, yet more preferably 55 to 65 minutes.

Step a) of the process in accordance with the invention is preferably carried out for a specific time period. The extraction duration may be influenced, inter alia, by the choice of the at least one organic solvent, preferably of the at least one alcohol and/or of the at least one ketone, the temperature and the pressure. In addition, the type and quality of the lignin-containing starting material plays a role in the extraction duration. In accordance with the invention, it has been shown that good extraction results are obtained independently when the selected parameters are in the range 5 to 200 minutes. The extraction efficiency of the process in accordance with the invention from a lignin-containing starting material also depends on the material used and how it is processed. In accordance with the invention, it has been shown that extraction in the range of 5 to 200 minutes is particularly advantageous as regards extraction efficiency, the formation of any degradation products, and costs.

In accordance with a further preferred embodiment of the present invention, the lignin-containing starting material is selected from the group consisting of wood, straw, preferably wheat straw or rye straw, and bark.

In principle, any starting materials which contain lignin are suitable, wherein particularly preferably, plant raw materials are used. Furthermore, waste or by-products from other processes may be used as the lignin-containing starting materials. Thus, for example, lignin-containing by-products from paper and cellulose production are also suitable for the production of the lignin particles in accordance with the invention.

In order to extract the lignin from the lignin-containing starting material as efficiently as possible, or in order to obtain a high extraction efficiency, the lignin-containing starting material which is used directly for the extraction of the lignin preferably has a mean or maximum size of 0.5 to 50 mm, preferably 0.5 to 40 mm, yet more preferably 0.5 to 30 mm, yet more preferably 1 to 25 mm, yet more preferably 1 to 20 mm, yet more preferably 5 to 10 mm.

Before carrying out the extraction of the lignin, the lignin-containing starting material to be extracted is comminuted in order to obtain the preferred size or size distribution. In this regard, the raw material from which the lignin-containing starting material is produced is comminuted by milling, cutting and similar methods. With the aid of one or more screens, for example, those components of the raw material to be processed which do not have the preferred size or size distribution can be separated out.

In accordance with a preferred embodiment of the present invention, solid particles present in the extraction mixture are removed after step a) in order to obtain a lignin-containing supernatant.

After carrying out the extraction, after which lignin is in solution, the solid components of the mixture are removed. Screen and filtration processes and centrifugation are suitable in this regard. Particularly preferably, one or more centrifuging steps are provided which may optionally be combined with another process (for example screen or filter).

In accordance with a further preferred embodiment of the present invention, the solid particles separated from the extraction mixture are treated with the same mixture from step a) comprising at least one organic solvent and water and the supernatant obtained therefrom is fed to the lignin-containing supernatant from a preceding step of the process.

In order to increase the efficiency of the extraction and in order to dissolve lignin remaining in the already-treated lignin-containing starting material, the solid residue from the first or, when a plurality of extraction steps is employed, from the or a preceding step, is once again supplemented with an organic solvent/water mixture and treated. Preferably, this organic solvent/water mixture is essentially identical to the organic solvent/water mixture which was used in step a).

In accordance with a further preferred embodiment of the present invention, in step b), the lignin in the solution is precipitated by decreasing the pH and/or by reducing the concentration of the organic solvent in the organic solvent/water mixture, in particular by evaporating the organic solvent from the organic solvent/water mixture or by adding water or an acid/water mixture.

After the extraction and optionally after removing the insoluble and solid components from the extraction mixture, lignin particles, preferably nanolignin, are precipitated from the lignin-containing solution. The precipitation is carried out by reducing the quantity or concentration of organic solvent in the extract, for example by evaporating the organic solvent/water mixture. By adding water to the organic solvent/water mixture, the concentration of the organic solvent can also be decreased. What is vital in each case is the reduction of the solvent in the extraction mixture in order to enable the lignin to precipitate. In this regard, the total volume may be maintained essentially constant, for example by adding water, preferably distilled or deionized water. As an alternative to this, or in addition, lignin particles can be precipitated by decreasing the pH by acidifying the extraction solution. The extraction solution preferably has a pH prior to the extraction step which is in the neutral range, preferably a pH between 6.5 and 7.5, yet more preferably between 6.7 and 7.3, yet more preferably between 6.8 and 7.2, yet more preferably between 6.9 and 7.1, in particular approximately 7.

It has been shown to be particularly advantageous for the production of lignin particles for the organic solvent to be removed from the extraction solution at a specific rate. For this reason, preferably, the organic solvent is removed from the lignin-containing organic solvent/water mixture at a rate of 0.1 to 2% by weight/min, preferably 0.1 to 1% by weight/min, yet more preferably 0.1 to 0.8% by weight/min, yet more preferably 0.1 to 0.6% by weight/min, yet more preferably 0.1 to 0.5% by weight/min, yet more preferably 0.1 to 0.4% by weight/min, yet more preferably 0.2 to 0.35% by weight/min.

During the removal or reduction of the concentration of the solvent (for example by evaporation, by adding water or an acid/water mixture) after step a), the organic solvent of the organic solvent/water mixture is preferably exposed to a pressure of 50 to 500 mbar, preferably 50 to 300 mbar, yet more preferably 50 to 200 mbar, yet more preferably 75 to 200 mbar, yet more preferably 100 to 200 mbar, yet more preferably 120 to 180 mbar, yet more preferably 140 to 160 mbar, yet more preferably 140 to 150 mbar, in order to precipitate lignin particles.

In order to reduce the water content and the organic solvent content in the extraction solution, the pressure in the vessel in which the extraction solution is located is reduced with the aid of a pump at least into the negative pressure range, preferably into the vacuum range. In this manner, the organic solvent and water pass into the gaseous state and can thus be removed from the extraction solution.

In accordance with a preferred embodiment of the present invention, the organic solvent/water mixture is exposed to a temperature of 20° C. to 60° C., preferably 25° C. to 55° C., yet more preferably 30° C. to 50° C.

Evaporation can be accelerated by raising the temperature of the extraction solution.

In accordance with a particularly preferred embodiment of the present invention, prior to precipitating it out, the lignin in the solution is adjusted, for example by reduction of the concentration of the organic solvent in the organic solvent/water mixture, in particular by evaporation of the organic solvent/water mixture, and/or by decreasing the pH to 0.1 to 50 g of lignin/L of organic solvent/water mixture, preferably to 0.5 to 40 g/L, yet more preferably to 1 to 30 g/L, yet more preferably to 2 to 20 g/L.

In accordance with a further preferred embodiment of the present invention, the vaporized volume is partially or completely replaced by adding water, preferably distilled water. Precipitation of the lignin particles occurs upon decreasing the concentration of the organic solvent.

In accordance with a further preferred embodiment of the present invention, the pH of the organic solvent/water mixture upon precipitation of the lignin by reducing the concentration of the organic solvent in the organic solvent/water mixture is decreased by adding a water/acid mixture with a pH of 1 to 6, preferably 1.2 to 5, yet more preferably 1.3 to 4, yet more preferably 1.5 to 3, yet more preferably 1.8 to 2.5, and in this manner, the vaporized volume is partially or completely replaced if appropriate. In this embodiment of the process in accordance with the invention as well, the extraction solution preferably comprises a specific concentration of lignin or is adjusted thereto. Before decreasing the pH, the lignin in the organic solvent/water mixture thus preferably comprises 0.1 to 50 g of lignin/L of organic solvent/water mixture, preferably 0.5 to 40 g/L, yet more preferably 1 to 30 g/L, yet more preferably 2 to 20 g/L.

By means of the process in accordance with the invention, lignin particles can also be produced by reduction of the pH and of the concentration of the organic solvent by adding dilute acids or water. Lignin particles may be formed in this manner.

In accordance with a preferred embodiment of the present invention, the pH is decreased by adding water, preferably distilled or deionized water, and/or an acid selected from the group consisting of sulphuric acid, phosphoric acid, nitric acid or an organic acid, particularly preferably by adding sulphuric acid. Particularly preferably, the acid is diluted with water and added for the precipitation of step b) in order to obtain the pH required for the precipitation.

The organic acid which may be used to decrease the pH of the lignin-containing extract after step a) is preferably a $C_1$ to $C_5$ carboxylic acid, preferably formic acid, acetic acid, propionic acid or butanoic acid.

In accordance with a preferred embodiment of the present invention, prior to precipitation, the pH of the solution from step b) is adjusted to a range of 1 to 6, preferably 2 to 5.5, yet more preferably 3 to 5.3, yet more preferably 4 to 5.2, or is appropriately adjusted by adding acids or water-acid mixtures as discussed above.

In accordance with a preferred embodiment of the present invention, the pH is decreased by adding an acid at a specific dosing rate of 0.05 to 10 mL/min per g of extract solution, preferably 0.05 to 8 mL/min per g of extract solution, yet more preferably 0.05 to 6 mL/min per g of extract solution, yet more preferably 0.05 to 4 mL/min per g of extract solution, yet more preferably 0.08 to 8 mL/min per g of extract solution, yet more preferably 0.08 to 6 mL/min per g of extract solution, yet more preferably 0.08 to 4 mL/min per g of extract solution, yet more preferably 0.08 to 3 mL/min per g of extract solution, yet more preferably 0.08 to 2.5 mL/min per g of extract solution, yet more preferably 0.1 to 2 mL/min per g of extract solution, yet more preferably 0.1 to 8 mL/min per g of extract solution, yet more preferably 0.1 to 6 mL/min per g of extract solution, yet more preferably 0.1 to 4 mL/min per g of extract solution, yet more preferably 0.1 to 3 mL/min per g of extract solution, yet more preferably 0.1 to 2.5 mL/min per g of extract solution, yet more preferably 0.1 to 2 mL/min per g of extract solution.

It has been observed that, surprisingly, it is advantageous for the pH and the concentration of the organic solvent of the lignin-containing extraction solution to be decreased at a specific rate.

The precipitated lignin particles or the nanolignin may be isolated after the precipitation step, washed with water and dried if appropriate.

In these latter steps of the process for the production of lignin particles, particularly advantageously, after step b) the lignin particles are washed, preferably with a solution having a pH of 1 to 5, preferably 1.5 to 4, yet more preferably 1.5 to 3, yet more preferably 2 to 3, instead of water. This solution may comprise the organic and/or inorganic acids cited above for correspondingly reducing the pH, wherein sulphuric acid is particularly preferably used. As an alternative thereto, the lignin particles may also be washed with water, either distilled or deionized water.

BRIEF DESCRIPTION OF THE FIGURES

The present invention will now be described in more detail with the aid of the following examples and figures, without in any way being limited thereby.

In a further aspect, the present invention concerns lignin particles which can be produced using the process in accordance with the invention. Because of the special production process, the lignin particles produced in accordance with the invention have a particular purity compared with conventionally produced lignin particles, wherein the lignin particles in accordance with the invention are free from sulphur, because throughout the entire course of the process, no sulphur has been bonded to the chemical structure of the lignin.

DETAILED DESCRIPTION

Examples

Example 1

Production of Lignin-Containing Solution

Lignin was dissolved out from wheat straw (as an alternative, another lignocellulose-containing raw material such as wood could be used) using a suitable process. The raw material was comminuted by milling prior to extraction and screened as a function of the reactor size (for a laboratory reactor with an internal volume of 1 L, the size of the straw particles was 1-5 mm, and for an industrial reactor with an internal volume of 10 to 50 L, it was 5-20 mm).

The extraction of lignin from the comminuted and screened raw material was carried out in a pressure reactor with an ethanol/water mixture having an ethanol concentration of 60% by weight at a temperature of 180° C. and with a dwell time of 60 minutes. Subsequently, the mixture was cooled to room temperature. Next, the remaining straw was separated from the pulping solution by filtration and washed with an ethanol/water mixture with an ethanol concentration of 60% by weight and then separated again by filtration. The washing solution isolated thereby was purified with the pulping solution or further processed separately. The pulping solution or the washing solution was rendered free from particles by centrifuging at approximately 14000 rpm and by fine filtration. After this, the nanolignin was precipitated directly out of the solution which was produced (see Examples 2 to 4).

Example 2

Distillation Precipitation of Lignin Particles

Figure 7:
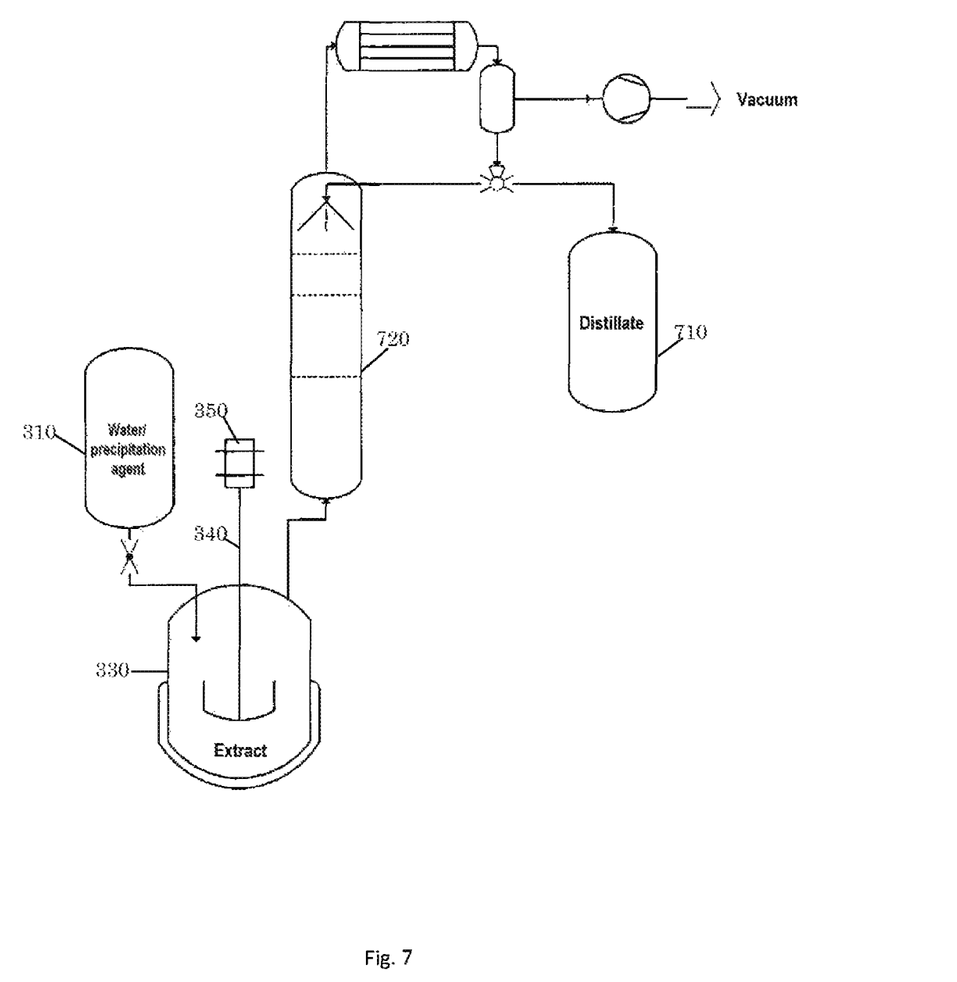
FIG. 7 shows a device for distillation precipitation of lignin particles from a lignin-containing and solvent-containing extract (see Example 1). Water or precipitation agent (for example dilute sulphuric acid) are placed in an additional container to keep the sump level at least partially constant by means of metered addition.

The distillation precipitation of lignin from an extract into a distillation containing 710 in accordance with Example 1 was carried out using the apparatus shown in FIG. 7. This principally consisted of a vacuum distillation column 720 and a sump piston which was heated using a water bath. In addition, water or water with sulphuric acid (pH 2) could be metered in in order to keep the sump level constant and to minimize encrustation of the sump piston. The temperature of the sump and of the head as well as the quantity of water or sulphuric acid with water to be metered in was recorded throughout the test.

Figure 8:
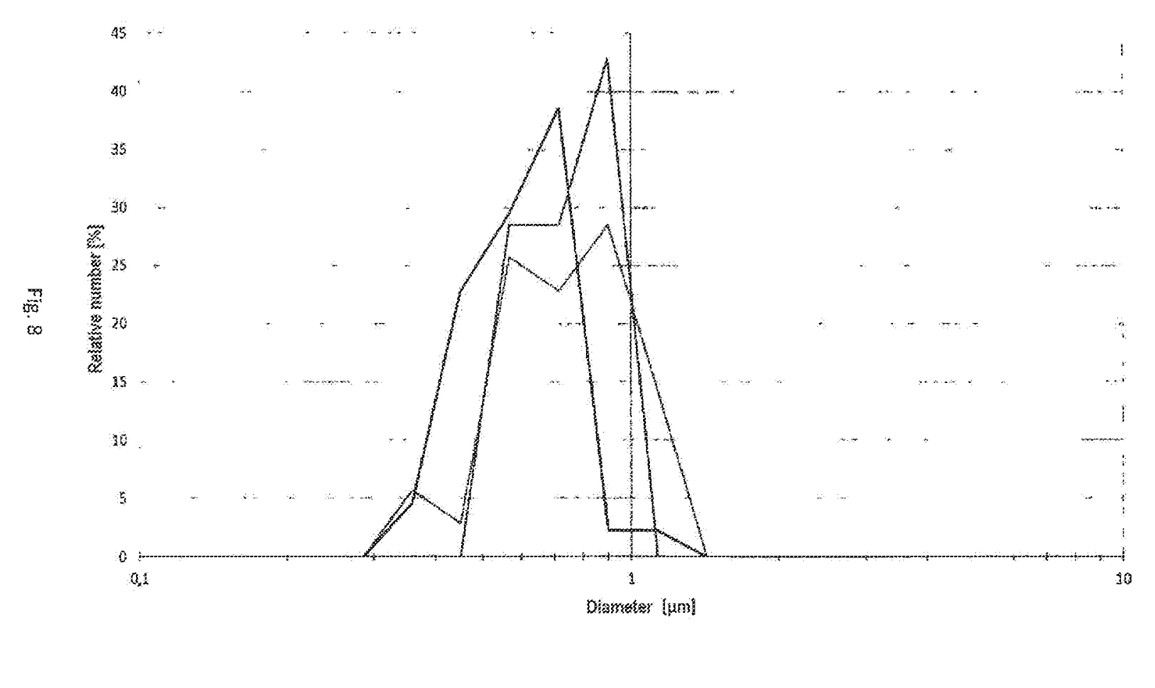
FIG. 8 shows the size distribution of lignin particles precipitated from a lignin-containing extract by distillation precipitation at a defined reduction rate for the organic solvent in the extract of 0.29% by weight/min.

The ethanol content in the lignin-containing extract in accordance with Example 1 was 54.68% by weight prior to the start of distillation. The distillation conditions were selected in a manner such that the reduction rate for the ethanol in the extract was 0.29% by weight ethanol/min. Water was metered in at the same rate. At the end of distillation, a sump product was obtained which amounted to 4.68% by weight of the starting extract. Subsequently, the precipitated particles were washed with water. The size of the lignin particles produced with this process was essentially below 1 μm (see FIG. 8).

Example 3

Precipitation of Nanolignin by Decreasing the pH

A solution from Example 1 with a lignin concentration of 5 to 15 g/L was used for the precipitation of lignin by decreasing the pH. For the precipitation, the lignin-containing solution was provided and dilute sulphuric acid with a pH of 1 or a pH of 2 or 98% sulphuric acid was added with constant stirring until the pH of the dispersion obtained was approximately 2-2.3. As an alternative, in a further aliquot, acetic acid was added to decrease the pH, wherein in this case, the pH was reduced to approximately 3.3. The precipitate was subsequently separated by centrifuging and dried at approximately 40° C.

Example 4

Particle Size Distribution with Extracts of Different Pulping Temperatures

In order to investigate the influence of the pulping temperature on the particle size distribution, the extraction of the lignin in accordance with Example 1 was carried out at 160° C., 180° C. and 200° C. Subsequently, the extract was filtered and centrifuged (24000×g), in order to remove insoluble particles from the extract. Finally, lignin particles in accordance with Example 3 were precipitated out of the particle-free extract.

Figure 1:
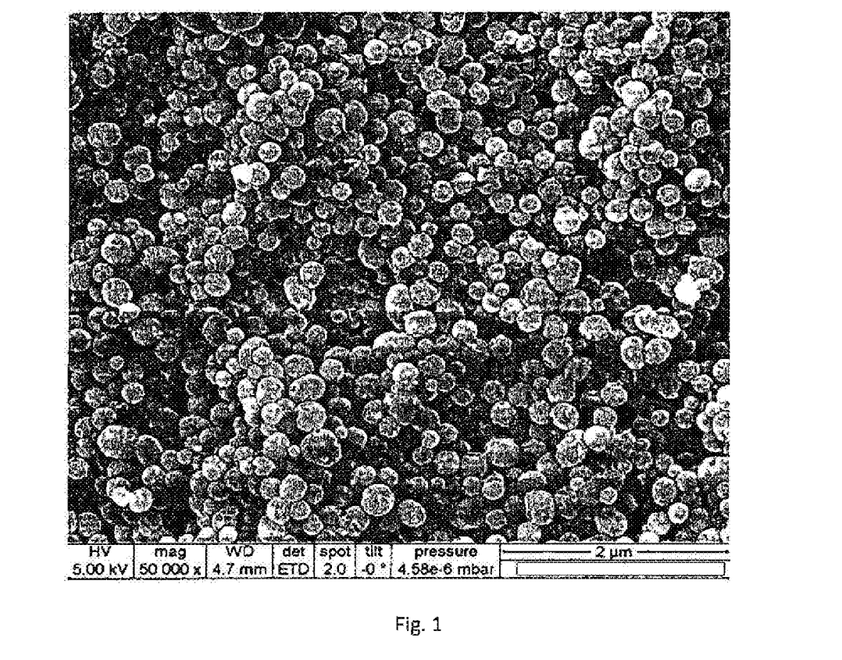
FIG. 1 shows a scanning electron microscope image of lignin particles which can be produced with the process in accordance with the invention.
Figure 2:
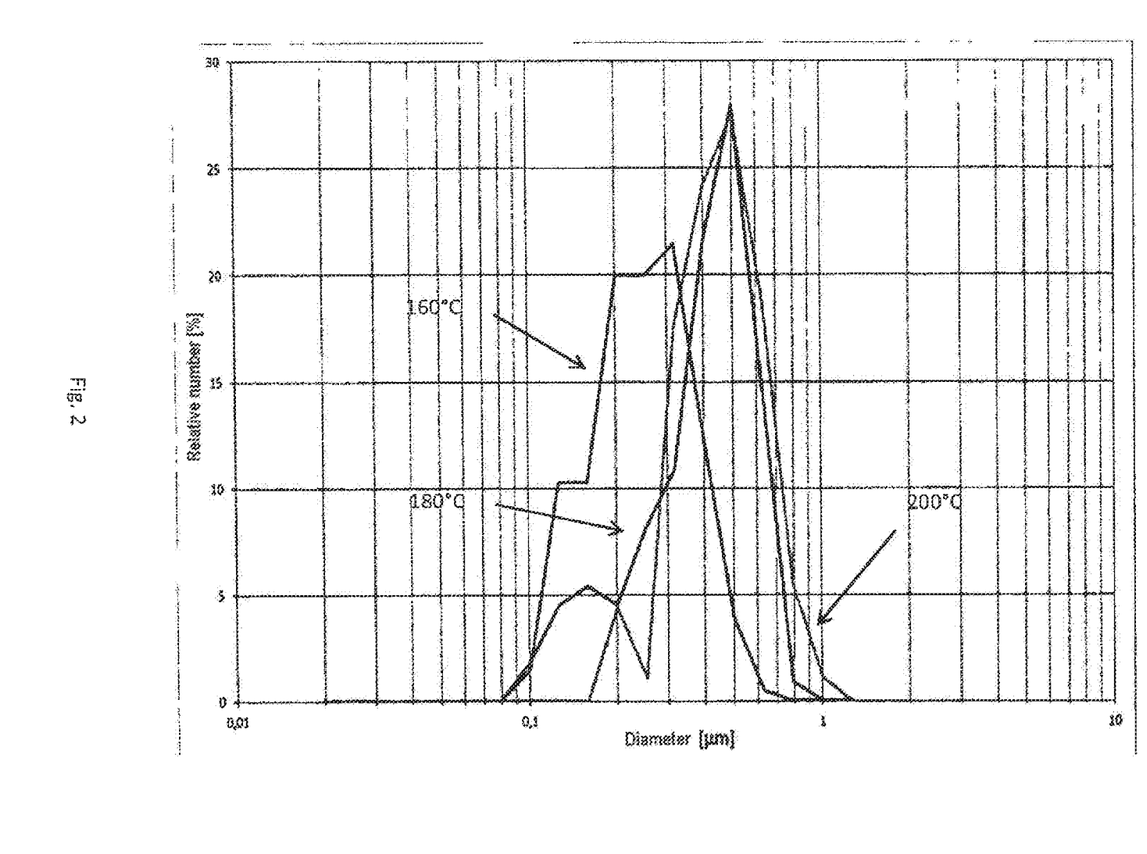
FIG. 2 shows the size distribution of lignin particles which are precipitated from lignin-containing extracts, produced at different temperatures.

From FIG. 2 it can be seen that, with extracts which had been produced using the above pulping temperatures, lignin particles could be precipitated which for the most part had a diameter of less than 1 μm. In particular, it can be seen that a pulping temperature of 180° C. or 200° C. resulted in a more homogeneous size distribution for the lignin particles.

Example 5

Influence of Dosing Rate (Addition of an Acid to a Lignin Solution) on the Formation of Lignin Particles This example investigated the influence of the rate of addition of an acid on the formation of lignin particles from a lignin-containing extraction solution in accordance with Example 1.

Figure 3:
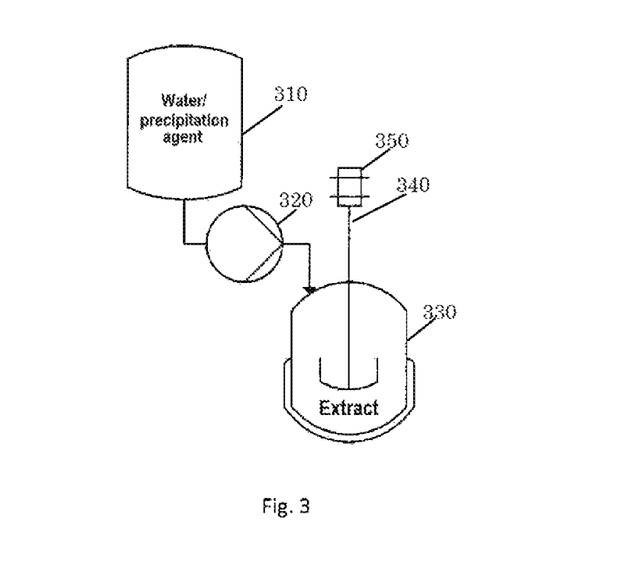
FIG. 3 shows equipment for precipitating lignin particles which comprises a container for accommodating a lignin-containing extract and containing a stirring element coupled to a motor. The container is connected to a precipitation agent container via a titrator.

The wheat straw extract from Example 1 was introduced into a stirring apparatus in accordance with FIG. 3. FIG. 3 shows equipment for precipitating lignin particles which comprises a container 330 for accommodating a lignin-containing extract and containing a stirring element 340 coupled to a motor 350. The container is connected to a precipitation agent container 310 via a titrator 320. With the aid of a titrator 320, temperature-controlled sulphuric acid (pH 2) was metered into the temperature controlled (25° C.) stirring apparatus 330 which contained the wheat straw extract. In this regard, different dosing rates were used in order to determine the influence of dosing rate (the parameters can be seen in Table 1).

TABLE 1

| Details of precipitations at different dosing rates | | | | |
|---|---|---|---|---|
| Dosing rate | [mL/min] | 1 | 4 | 50.9 |
| Extract | [g] | 30.62 | 34.07 | 26.17 |
| Dosed quantity | [mL] | 116 | 134 | 116 |
| Specific dosing rate with respect to extract mass | [mL/min * g] | 0.03 | 0.12 | 1.94 |

Figure 4:
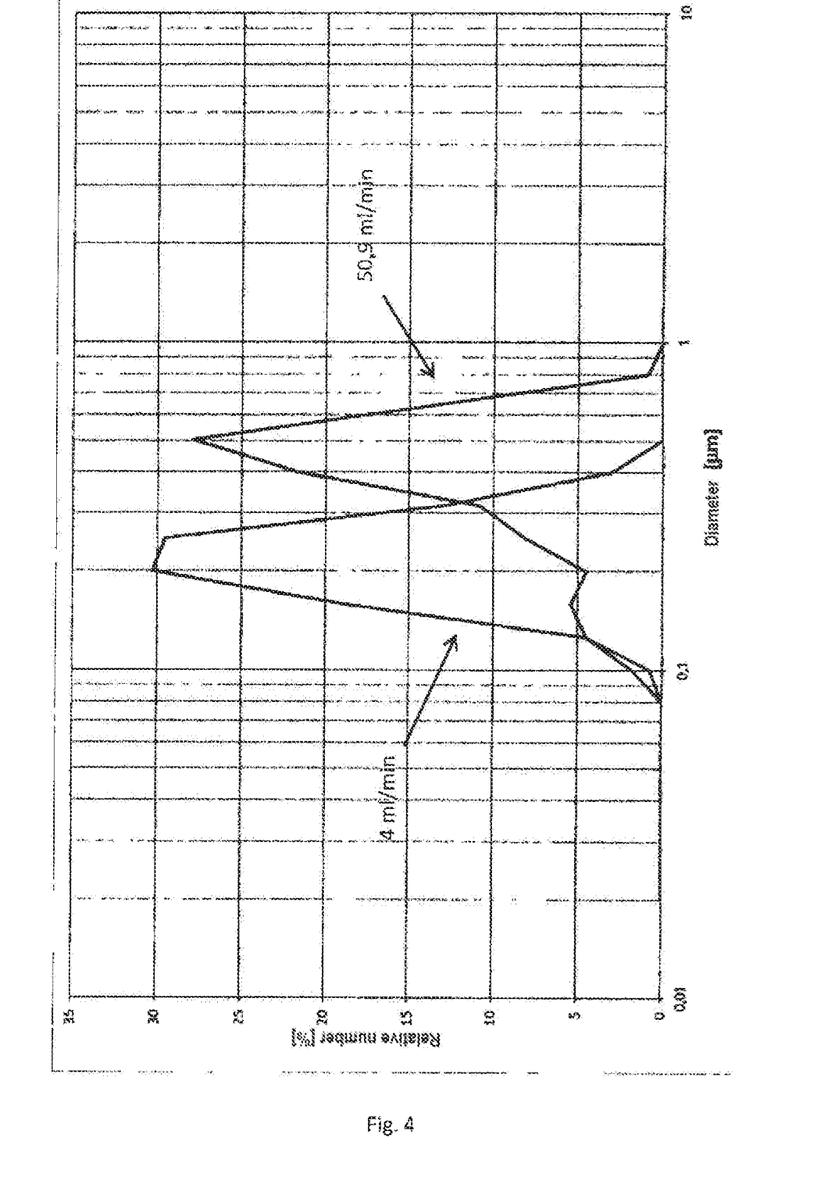
FIG. 4 shows the size distribution of lignin particles which have been precipitated from lignin-containing extracts at different rates for dosing the precipitation agent.

Following precipitation of the lignin particles, they were separated by centrifuging and examined by SEM imaging. This showed that for a dosing rate of acid of 1 mL/min or 0.03 mL/min per g of extract, no detectable individual particles were present. At dosing rates of 4 mL/min or 0.12 mL/min per g of extract and 50.9 mL/min or 1.94 mL/min per g of extract, the formation of lignin particles could be observed. The size distribution of the lignin particles is shown in FIG. 4. Lignin particles with a size of less than 1 μm could be produced for both dosing rates.

Example 6

Influence of Precipitation Apparatus on the Formation of Lignin Particles

Figure 5:
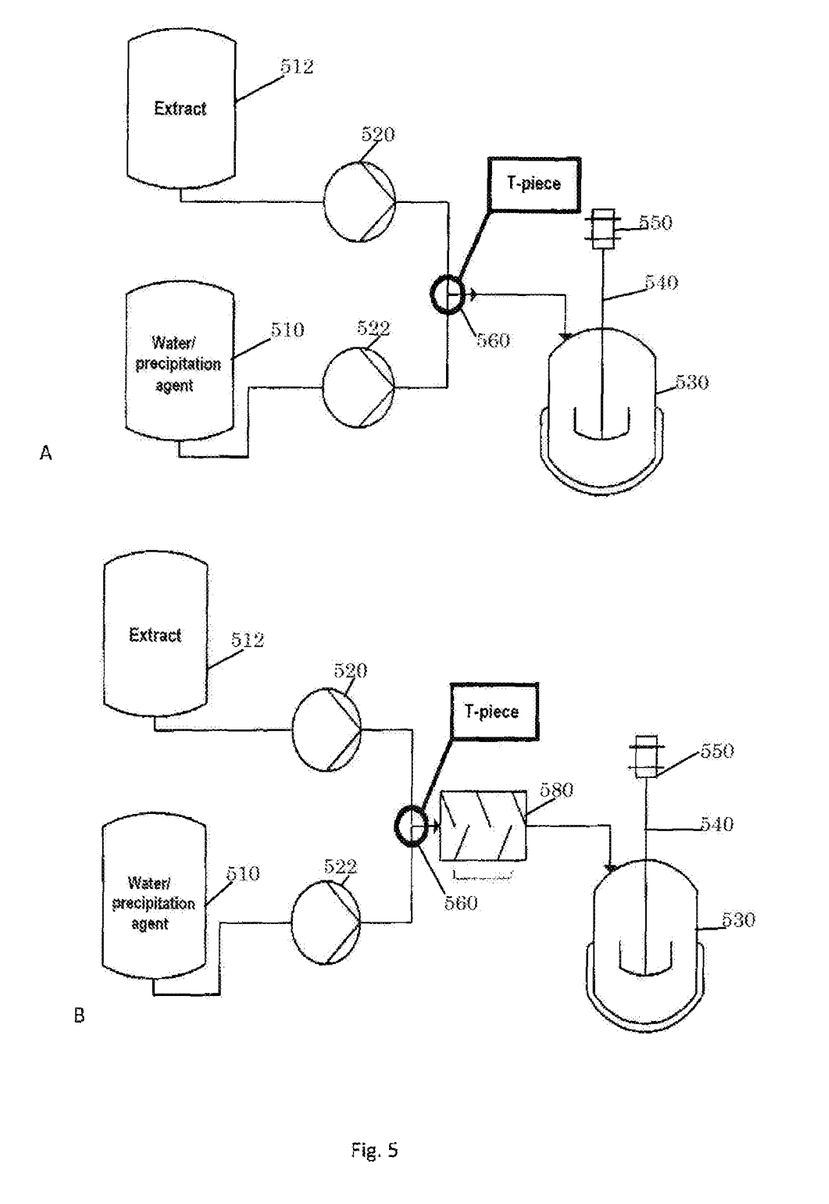
FIG. 5 shows precipitation apparatus with a T mixer (T-piece) in which the extract solution and the precipitation agent mix together (FIGS. 5A and B). Static mixing elements may be installed after the T mixer (FIG. 5B).

In order to investigate whether the precipitation apparatus had an influence on the size or size distribution of the lignin particles, the precipitation of lignin particles from an extract in accordance with Example 1 was carried out using equipment in accordance with FIG. 3 and FIG. 5 (without (A) and with (B) mixing elements). FIG. 5 shows precipitation apparatus with a T mixer (T-piece 560) in which the extract solution from the extract solution container 512 and the precipitation agent from the precipitation agent container 510 are titrated together through titration elements 520 and 522 respectively to mix together in mixing vessel 530 equipped with a stirring element 540 coupled to a motor 550 (FIGS. 5A and B). Static mixing elements may be installed after the T mixer 580 (FIG. 5B).

Figure 6:
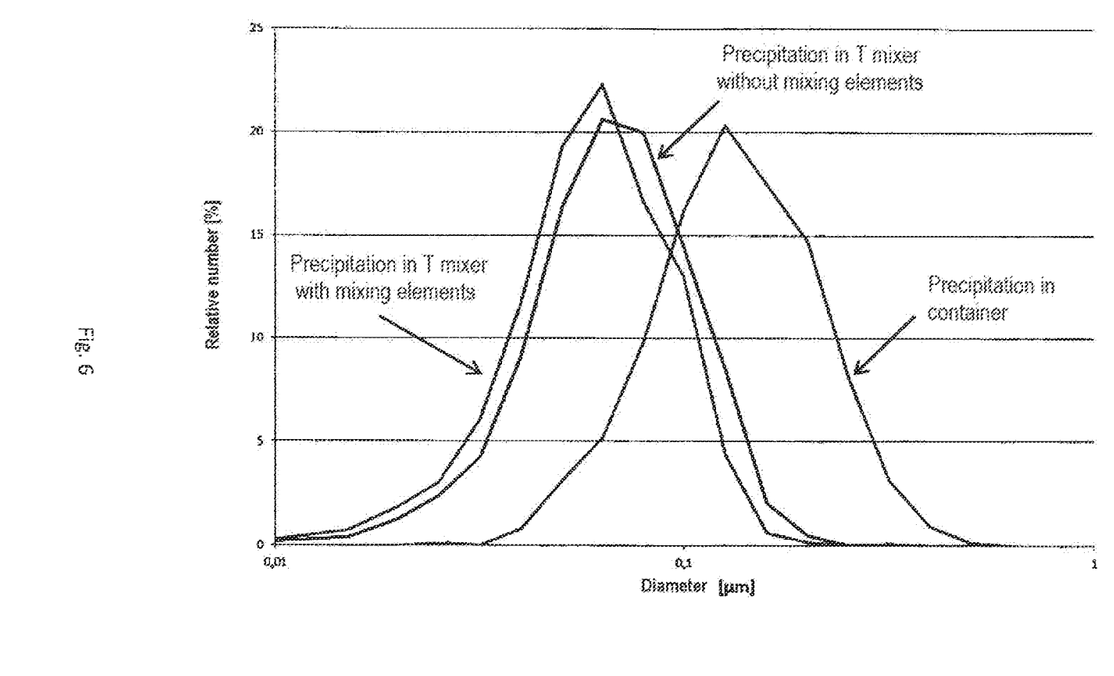
FIG. 6 shows the size distribution of lignin particles which have been precipitated from lignin-containing extracts with different devices.

The results shown in FIG. 6 show that lignin particles of less than 1 μm could be produced using all three pieces of equipment.

The invention claimed is:

1. A process for the production of lignin particles, comprising the steps of:
   a) extracting lignin from a lignin-containing starting material by using a mixture comprising at least one organic solvent and water, adjusting an amount of lignin in solution to 0.1 to 50 g of lignin/L of organic solvent/water mixture, and
   b) precipitating the lignin in solution from step a) to obtain lignin particles, wherein the lignin particles have a mean size of 10 to 800 nm,
   wherein in step b), the lignin in solution is precipitated by decreasing the pH by adding an acid at a dosing rate of 0.05 to 10 mL/min per g of extract solution.

2. The process as claimed in claim 1, wherein insoluble components present in the solution from step a) are removed prior to step b).

3. The process as claimed in claim 1, wherein the solution for precipitation in step b) comprises a maximum of 1% of insoluble components.

4. The process as claimed in claim 1, wherein in step b), the lignin in solution is precipitated by reducing the concentration of the organic solvent in the organic solvent/water mixture.

5. The process as claimed in claim 4, wherein the organic solvent is removed from the lignin-containing organic solvent/water mixture at a rate of 0.1 to 2% by weight/min.

6. The process as claimed in claim 4, wherein the organic solvent/water mixture is exposed to a pressure of 50 to 500 mbar, in order to precipitate lignin particles.

7. The process as claimed in claim 4, wherein the organic solvent/water mixture is exposed to a temperature of 20° C. to 60° C.

8. The process as claimed in claim 4, wherein the pH of the organic solvent/water mixture upon precipitation of the lignin by reducing the concentration of the organic solvent in the organic solvent/water mixture is decreased by adding a water-acid mixture with a pH of 1 to 6.

9. The process as claimed in claim 1, wherein the pH is decreased by adding water and/or an acid selected from the group consisting of sulphuric acid, phosphoric acid, nitric acid and an organic acid.

10. The process as claimed in claim 1, wherein after precipitation of the lignin particles, the pH of the organic solvent/water mixture is adjusted to be in a range of 1 to 6.

11. The process as claimed in claim 1, wherein after step b), the precipitated lignin particles are washed, with a solution having a pH of 1 to 5 or with water.

12. The process as claimed in claim 1, wherein the at least one organic solvent is an alcohol or a ketone.

13. The process as claimed in claim 1, wherein the extraction is carried out at a temperature of 100° C. to 230° C.

14. The process as claimed in claim 1, wherein the extraction is carried out at a pressure of 1 to 100 bar.

15. The process as claimed in claim 1, wherein the extraction is carried out for 5 to 200 minutes.

16. The process as claimed in claim 1, wherein the lignin-containing starting material is selected from the group consisting of perennials, and annuals.

17. The process as claimed in claim 1, wherein the lignin-containing starting material has a mean size of 0.5 to 50 mm.

18. The process as claimed in claim 1, wherein the at least one organic solvent is ethanol.

19. The process of claim 1, wherein a lignin concentration is 0.5 to 40 g/L of organic solvent/water mixture.

20. The process of claim 1, wherein a lignin concentration is 1 to 30 g/L of organic solvent/water mixture.

21. The process of claim 1, wherein a lignin concentration is 2 to 20 g/L of organic solvent/water mixture.

22. The process of claim 1, wherein the obtained lignin particles have a mean size of 10 to 600 nm.

23. The process of claim 1, wherein the obtained lignin particles have a mean size of 10 to 400 nm.

24. The process of claim 1, wherein the obtained lignin particles have a mean size of 10 to 200 nm.

25. The process of claim 1, wherein the obtained lignin particles have a mean size of less than 100 nm.

\* \* \* \* \*